US012174563B2

(12) United States Patent
Sunamura et al.

(10) Patent No.: US 12,174,563 B2
(45) Date of Patent: Dec. 24, 2024

(54) IMAGE FORMING APPARATUS CONTROLLING CURRENT BALANCE BASED ON ENVIRONMENTAL CONDITIONS

(71) Applicant: CANON KABUSHIKI KAISHA, Tokyo (JP)

(72) Inventors: Kaito Sunamura, Kanagawa (JP); Shuji Saito, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/083,016

(22) Filed: Dec. 16, 2022

(65) Prior Publication Data

US 2023/0195010 A1 Jun. 22, 2023

(30) Foreign Application Priority Data

Dec. 17, 2021 (JP) ................................ 2021-205614

(51) Int. Cl.
*G03G 15/16* (2006.01)
*G03G 15/00* (2006.01)

(52) U.S. Cl.
CPC ....... *G03G 15/1675* (2013.01); *G03G 15/161* (2013.01); *G03G 15/5008* (2013.01); *G03G 15/5045* (2013.01); *G03G 2215/1661* (2013.01)

(58) Field of Classification Search
CPC ............ G03G 15/1675; G03G 15/161; G03G 15/5008; G03G 15/5045; G03G 2215/1661
See application file for complete search history.

(56) References Cited

U.S. PATENT DOCUMENTS

| | | | | |
|---|---|---|---|---|
| 10,656,564 | B2 | 5/2020 | Takayanagi | |
| 10,761,458 | B2 | 9/2020 | Takeuchi | |
| 2018/0224774 | A1 * | 8/2018 | Takayanagi | G03G 15/80 |

FOREIGN PATENT DOCUMENTS

| | | | | |
|---|---|---|---|---|
| JP | 2005-275022 | A | | 10/2005 |
| JP | 2015230474 | A | * | 12/2015 |
| JP | 2016-145908 | A | | 8/2016 |
| JP | 2018-128613 | A | | 8/2018 |
| JP | 2020-034699 | A | | 3/2020 |

OTHER PUBLICATIONS

JP_2015230474_A_I Machine Translation, Japan, 2015, Aida et al.*

* cited by examiner

*Primary Examiner* — Carla J Therrien
(74) *Attorney, Agent, or Firm* — Venable LLP

(57) ABSTRACT

An image forming apparatus includes an image bearing member, an intermediary transfer member having ion conductivity and a rotatable endless belt shape, a primary transfer member, a secondary transfer member, a cleaning member, an environment sensor and a controller. Based on a result of the environment sensor, the controller controls so as to change a current balance based on an integrated value of a first current value and an integrated value of a second current value. The first current value is a current flowing from inside of the intermediary transfer member to outside thereof and the second current value is a current flowing from outside of the intermediary transfer member to inside thereof.

20 Claims, 8 Drawing Sheets

IMAGE FORMING APPARATUS CONTROLLING CURRENT BALANCE BASED ON ENVIRONMENTAL CONDITIONS

FIELD OF THE INVENTION AND RELATED ART

The present invention relates to an image forming apparatus, such as a printer, copier, FAX machine, etc., using an electrophotographic method or electrostatic recording method.

Conventional image forming apparatuses using the electrophotographic method and the like include intermediate transfer type image forming apparatuses that use an intermediate transfer unit. In an image forming apparatus of the intermediate transfer method, for example, a toner image formed on a photosensitive member as an image carrier is primarily transferred onto an intermediate transfer unit, and then the toner image on the intermediate transfer unit is secondarily transferred onto a recording material. An intermediate transfer belt formed by an endless belt is widely used as an intermediate transfer unit. The following is an example of an intermediate transfer electrophotographic image forming apparatus with an intermediate transfer belt as an intermediate transfer unit.

In an intermediate transfer type image forming apparatus, toner (secondary transfer residual toner) remains on the intermediate transfer belt after the secondary transfer process. Therefore, a cleaning process is required to remove the secondary transfer residual toner on the intermediate transfer belt before the next toner image is transferred to the intermediate transfer belt. A blade cleaning method is widely used for this cleaning process. In the blade cleaning method, a cleaning blade is positioned downstream from the secondary transfer portion and upstream from the primary transfer portion in the moving direction of the intermediate transfer belt surface as a cleaning component contacting the surface of the intermediate transfer belt. The cleaning blade physically scrapes off the secondary transfer residual toner from the moving intermediate transfer belt and collects the toner. The cleaning blade is generally made of an elastic material such as urethane rubber. This cleaning blade is often positioned in a counter direction to the moving direction of the intermediate transfer belt surface, i.e., with its free end portion facing upstream in the moving direction of the intermediate transfer belt surface, and the edge portion of the free end portion is pressed against the intermediate transfer belt surface.

In the blade cleaning method, it is known that the scraping performance (cleaning performance) of the cleaning blade decreases in low temperature and low humidity environments. The reason for this is that the frictional force between the cleaning blade and the intermediate transfer belt decreases because the performance of the cleaning blade as an elastic body drops in a low-temperature environment, resulting in a smaller contact area and because the moisture content on the surface of the intermediate transfer belt decreases in a low humidity environment. To increase the frictional force between the cleaning blade and the intermediate transfer belt, there is a method of increasing the contact pressure of the cleaning blade. However, this method increases the risk of noise (squealing) caused by the vibration of the cleaning blade or, in more advanced cases, the risk of the cleaning blade becoming flimsy (blurred) due to the increased frictional force between the cleaning blade and the intermediate transfer belt in high temperature and high humidity environments.

In response to these issues, Japanese Laid-Open Patent Application No. 2005-275022 attempts to maintain a stable frictional force between the cleaning blade and the intermediate transfer belt at all times by changing the application area and amount of lubricant applied depending on the humidity in the image forming apparatus.

However, the above conventional technology requires a special lubricant application means. Therefore, from the viewpoint of simplification and cost reduction of the equipment configuration, it is desirable to be able to maintain a stable frictional force between the cleaning blade and the intermediate transfer belt with a simple configuration, without requiring such special lubricant application means.

Recently, there is a demand for further improvement of durability in image forming apparatuses, and even in image forming apparatuses using the blade cleaning method, there is a need to improve the durability against repeated use. Although durability can be improved by reducing the contact pressure of the cleaning blade, it becomes difficult to ensure stable cleaning performance. Thus, while extending the lifespan of the cleaning unit, it is also necessary to ensure stable cleaning performance.

SUMMARY OF THE INVENTION

Therefore, the purpose of the present invention is to maintain the cleaning performance in a configuration with a cleaning member in contact with the surface of the intermediate transfer unit.

The above-mentioned purpose is achieved with the image forming apparatus according to the present invention. In summary, according to one embodiment, the present invention is an image forming apparatus comprising an image bearing member configured to bear a toner image; an intermediary transfer member having ion conductivity and a rotatable endless belt shape; a primary transfer member configured to primary-transfer the toner image from the image bearing member to the intermediary transfer member at a primary transfer portion; a secondary transfer member configured to secondary-transfer the toner image from the intermediary transfer member to a recording material at a secondary transfer portion; a cleaning member configured to remove deposited matter of an outer surface of the intermediary transfer member by contacting the outer surface of the intermediary transfer member; an environment detecting portion configured to detect at least one of an environment temperature and an environment humidity; a primary transfer voltage applying portion configured to apply a primary transfer voltage so as to flow a current of a first current value between the primary transfer member and the intermediary transfer member; a secondary transfer voltage applying portion configured to apply a secondary transfer voltage so as to flow a current of a second current value between the secondary transfer member and the intermediary transfer member; and a control portion configured to control the primary transfer voltage applying portion and the secondary transfer voltage applying portion, wherein, based on a detecting result of the environment detecting portion, the control portion controls so as to change a current balance based on an integrated value of the first current value and an integrated value of the second current value, the first current value being the current flowing from inside of the intermediary transfer member to outside thereof and the second current value being the current flowing from outside of the intermediary transfer member to inside thereof.

According to another embodiment, the present invention is an image forming apparatus comprising an image bearing member configured to bear a toner image; an intermediary transfer member having ion conductivity and a rotatable endless belt shape; a primary transfer member configured to primary-transfer the toner image from the image bearing member to the intermediary transfer member at a primary transfer portion; a secondary transfer member configured to secondary-transfer the toner image from the intermediary transfer member to a recording material at a secondary transfer portion; a cleaning member configured to remove deposited matter of an outer surface of the intermediary transfer member by contacting the outer surface of the intermediary transfer member; a torque detecting portion configured to detect a rotational torque of a motor for driving the intermediary transfer member; a primary transfer voltage applying portion configured to apply a primary transfer voltage so as to flow a current of a first current value between the primary transfer member and the intermediary transfer member; a secondary transfer voltage applying portion configured to apply a secondary transfer voltage so as to flow a current of a second current value between the secondary transfer member and the intermediary transfer member; and a control portion configured to control the primary transfer voltage applying portion and the secondary transfer voltage applying portion, wherein, based on a detecting result of the torque detecting portion, the control portion controls so as to change a current balance based on an integrated value of the first current value and an integrated value of the second current value, the first current value being the current flowing from inside of the intermediary transfer member to outside thereof and the second current value being the current flowing from outside of the intermediary transfer member to inside thereof.

Further features of the present invention will become apparent from the following description of exemplary embodiments with reference to the attached drawings.

DESCRIPTION OF THE EMBODIMENTS

The following is a more detailed explanation of an image forming apparatus according to the present invention in accordance with the drawings.

1. Configuration and Operation of the Image Forming Apparatus

Figure 1:
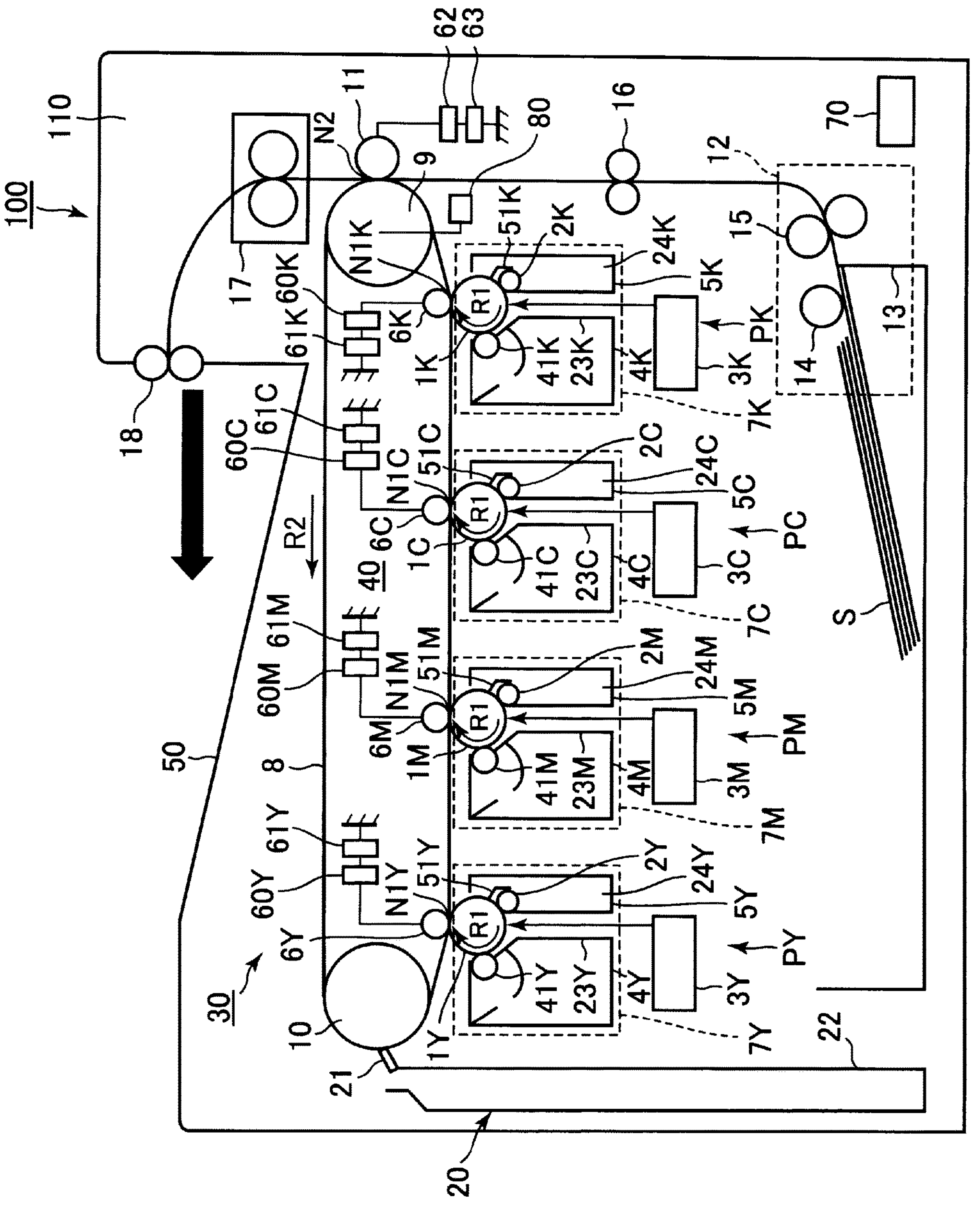
FIG. 1 is a schematic cross-sectional view of the image forming apparatus.

FIG. 1 is a schematic cross-sectional view of an image forming apparatus 100 according to the present embodiment. The image forming apparatus 100 according to the present embodiment is a tandem-type laser printer employing the intermediate transfer method, which is capable of forming full-color images using the electrophotographic method.

The image forming apparatus 100 has an image forming portion 30 capable of superimposing and forming four-color toner images of yellow (Y), magenta (M), cyan (C), and black (K) as multi-color toner images on a rotating intermediate transfer belt 8. The image forming portion 30 has image forming units (stations) PY, PM, PC, and PK that form toner images of yellow (Y), magenta (M), cyan (C), and black (K) colors, respectively. Elements having the same or corresponding functions or configuration in each of the image forming units PY, PM, PC, and PK may be described in general terms by omitting Y, M, C, and K at the end of the symbols indicating that the element is for one of the colors. In the present embodiment, an image forming unit P consists of a photosensitive drum 1, charging roller 2, exposure unit 3, developing unit 4, primary transfer roller 6, and drum cleaning unit 5, which will be explained later.

The photosensitive drum 1, which is a rotatable drum-type photosensitive member (electrophotographic photosensitive member) as an image carrier, is driven by a drum driving motor 91 (FIG. 8) as a driving means (drive source) at a predetermined circumferential speed in the direction of arrow R1 (clockwise direction) in FIG. 1. In the present embodiment, the photosensitive drum 1 is driven to rotate at a peripheral speed of 300 mm/s (equivalent to process speed) when a recording material S is plain paper. The surface of the rotating photosensitive drum 1 is uniformly charged to a predetermined potential of a predetermined polarity (negative polarity in the present embodiment) by the charging roller 2, a roller-type charging member as a charging means. During the charging process, a predetermined charging voltage (charging bias) of negative polarity is applied to the charging roller 2 by a charging power source (not shown) as the charging voltage applying means (charging voltage applying portion). The surface of the photosensitive drum 1 that has been charged is exposed by the exposure unit 3 (laser unit) as the exposure means, and an electrostatic latent image (electrostatic image) is formed on the photosensitive drum 1. The exposure unit 3 irradiates the photosensitive drum 1 with a laser beam based on an image signal.

The electrostatic latent image formed on the photosensitive drum 1 is developed (visualized) by the developing unit 4 as the developing means, which supplies toner as a developer to form a toner image (developer image) on the photosensitive drum 1. The developing unit 4 has a toner container 23 as a developer container and a developing roller 41 as a photosensitive member (developing member) that carries toner and feeds it toward the photosensitive drum 1. During the developing process, a predetermined developing voltage (developing bias) of negative polarity is applied to the developing roller 41 by a developing power source (not shown) as the developing voltage applying means (developing voltage applying portion). In the present embodiment, toner charged with the same polarity as that of the photosensitive drum 1 (negative polarity in the present embodiment) adheres to the exposed portion (image portion) on the photosensitive drum 1, where the absolute value of potential has decreased due to exposure after being uniformly charged (reverse development method). In the present embodiment, the major charging polarity of the toner during the development process, the normal charging polarity of the toner, is negative polarity.

An intermediate transfer belt 8, which is composed of a flexible, endless belt as an intermediate transfer member, is positioned opposite to the four photosensitive drums 1Y, 1M, and 1C. The intermediate transfer belt 8 is stretched over a plurality of driving rollers 9 and tension rollers 10 as tension rollers (support rollers) and is tensioned at a predetermined tension. On the inner circumferential side of the intermediate transfer belt 8, corresponding to each photosensitive drum 1Y, 1M, 1C, 1K, is a primary transfer roller 6, which is a roller-type primary transfer member as a primary transfer means. In the present embodiment, each primary transfer roller 6 is arranged to be in contact with the corresponding photosensitive drum 1 via the intermediate transfer belt 8. This forms the primary transfer portion (primary transfer nip portion) N1, which is the contacting portion between each photosensitive drum 1 and the intermediate transfer belt 8.

In the present embodiment, polyethylene naphthalate was used as the material configuring the base material of the intermediate transfer belt 8, but it is not limited to this. Polyethylene naphthalate, polycarbonate, polyvinylidene fluoride (PVDF), polyethylene, polypropylene, polymethylpentene-1, polystyrene, polyamide, and polysulfone can also be used as base materials for the intermediate transfer belt 8. Also, polyarylate, polybutylene terephthalate, polyimide, polybutylene naphthalate, polyphenylene sulfide, polyethersulfone, polyethernitrile, thermoplastic polyimide, polyetheretherketone, thermotropic liquid crystal polymer, polyamide acid and other thermoplastic resins such as polyamide acid can be used. Two or more of these can be used in mixture.

The intermediate transfer belt 8 is then composed of these thermoplastic resins containing ion-conductive materials that develop ion conductivity. In the present embodiment, an alkali metal salt is used as the ion-conductive material. Specifically, potassium perfluorobutanesulfonate (potassium nonafluorobutanesulfonate; C4F9SO3K) was used as the ion-conductive material in the present embodiment. This material is commercially available as "KFBS" (manufactured by Mitsubishi Materials Electronic Chemicals Co., Ltd.).

The intermediate transfer belt 8 may also have a surface layer made of a curable material, which is thermoset or cured by irradiation of energy rays such as ultraviolet or electron beams, from the viewpoint of increasing its surface rigidity and improving its durability (wear resistance). In the present embodiment, the intermediate transfer belt 8 has a surface layer. In the present embodiment, acrylic resin is used as the curable material configuring the surface layer of the intermediate transfer belt 8, but it is not limited to this. The curable material that constitutes the surface layer of the intermediate transfer belt 8 includes, of organic materials, curable resins such as acrylic resin, melamine resin, urethane resin, alkyd resin, and fluorine curable resin. Inorganic materials include alkoxysilane-alkoxyzirconium-based materials and silicate-based materials. Organic/inorganic hybrid materials include inorganic particulate-dispersed organic polymer materials, inorganic particulate-dispersed organoalkoxysilane materials, acrylic silicon materials, and organoalkoxysilane materials. Resin materials are preferred among curable materials in terms of wear resistance and crack resistance of the surface layer of the intermediate transfer belt 8, and among curable resins, acrylic resins obtained by curing acrylic copolymers containing unsaturated double bonds are preferred. Acrylic copolymers containing unsaturated double bonds are available, for example, such as Luciflor (trade mark, Nippon Paint Co., Ltd.), an acrylic UV-curable hard coating material.

In the present embodiment, the intermediate transfer belt 8 has a thickness of 70 μm, a circumference of 790 mm, a width (length in the direction orthogonal to the moving direction of the surface) of 250 mm, a volume resistivity of $1.0\times10^{9}$ Ω-cm, and a surface resistivity of $1.0\times10^{10}$ Ω/sq. The electrical characteristics of the intermediate transfer belt 8 were measured using a HIRESTA-UP MCP-HT450 (manufactured by Mitsubishi Chemical Corporation) at an applied voltage of 250 V under a temperature of 23° C. and relative humidity of 50%. The surface resistivity was measured from the back side (inner circumference side) of the intermediate transfer belt 8.

The intermediate transfer belt 8 rotates (circumferential movement, moving direction) in the direction of arrow R2 (counterclockwise) in FIG. 1 when the driving roller 9 is driven by the belt driving motor 92 (FIG. 8) as the driving means (drive source). The intermediate transfer belt 8 rotates at a peripheral speed corresponding to the peripheral speed of the photosensitive drum 1 (300 mm/s when the recording material S is plain paper). The tension roller 10 and each primary transfer roller 6 rotate driven by the rotation of the intermediate transfer belt 8. The toner image formed on the photosensitive drum 1 is primarily transferred onto the rotating intermediate transfer belt 8 by the action of the primary transfer rollers 6 in the primary transfer portion N1. During the primary transfer process, a predetermined primary transfer voltage (primary transfer bias) is applied to the primary transfer roller 6, which is a direct current voltage of the opposite polarity (positive polarity in the present embodiment) to the regular charging polarity of the toner, by a primary transfer power supply 60 as the primary transfer voltage applying means (primary transfer voltage applying portion). In the present embodiment, the primary transfer voltage is applied to each primary transfer roller 6 from an independent primary transfer power source 60. The primary transfer current flowing to each primary transfer roller 6 (primary transfer portion N1, primary transfer power source 60) can be detected by a primary transfer current detection circuit 61 as a primary transfer current detection means (primary transfer current detection portion) connected to each primary transfer power source 60. For example, during the formation of a full-color image, the toner images of four colors (yellow, magenta, cyan, and black) are sequentially primarily transferred in such a way that they are superimposed on the intermediate transfer belt 8.

On the outer circumferential side of the intermediate transfer belt 8, a secondary transfer roller (secondary transfer outer roller) 11, which is a roller-type secondary transfer member as a secondary transfer means, is positioned opposite to the driving roller 9, which also serves as the secondary transfer opposing roller (secondary transfer inner roller). The secondary transfer roller 11 contacts the driving roller 9 via the intermediate transfer belt 8. This forms a secondary transfer portion (secondary transfer nip portion) N2, which is the contacting portion between the intermediate transfer belt 8 and the secondary transfer roller 11. The secondary transfer roller 11 may be rotationally driven or may be driven to rotate with the rotation of the intermediate transfer belt 8. The toner image formed on the intermediate transfer belt 8 is secondarily transferred to the recording material S being fed between the intermediate transfer belt 8 and the secondary transfer roller 11 in the secondary transfer portion N2, under the action of the secondary transfer roller 11. During the secondary transfer process, a predetermined secondary transfer voltage (secondary transfer bias) is applied to the secondary transfer roller 11, which is a direct current voltage of the opposite polarity (positive polarity in the present embodiment) to the normal charging polarity of the toner, by the secondary transfer power source 62 as the means for applying the secondary transfer voltage (secondary transfer voltage applying portion). The secondary transfer current flowing to the secondary transfer roller 11 (secondary transfer portion N2, secondary transfer power source 62) can be detected by the secondary transfer current detection circuit 63 as the secondary transfer current detection means (secondary transfer current detection portion) connected to the secondary transfer power source 62. In the present embodiment, the driving roller 9 is electrically grounded.

A feeding unit 12 has a recording material cassette 13 that stacks and stores recording material S in sheet form, such as paper, a feeding roller 14 that feeds recording material S from within the cassette 13, and a feeding roller pair 15 that feeds the feeding roller 14 and feeds the recording material S. The recording material S, which is fed from the feeding unit 12 at a feeding speed of 300 mm/s, corresponding to the rotational speed of the intermediate transfer belt 8, is introduced into the secondary transfer portion N2 at a predetermined control timing by a resistor roller pair 16, and is nipped and fed by the secondary transfer roller 11 and the intermediate transfer belt 8. As a result, the toner image on the intermediate transfer belt 8 is secondarily transferred to the recording material S, which is nipped and fed by the secondary transfer roller 11 and intermediate transfer belt 8 as described above.

The recording material S onto which the toner image has been transferred is introduced into a fixing unit 17 as the fixing means. The fixing unit 17 fixes (melts and adheres) the toner image on the recording material S by heating and pressurizing the recording material S carrying the unfixed toner image. The recording material S on which the toner image has been fixed is discharged (output) by a discharge roller pair 18 onto a discharge tray 50 provided outside the main body 110 of the image forming apparatus 100.

On the other hand, the toner remaining on the surface of the photosensitive drum 1 after the primary transfer process (primary transfer residual toner) is removed from the surface of the photosensitive drum 1 and collected by the drum cleaning unit 5 as a photosensitive member cleaning method. The drum cleaning unit 5 has a drum collected toner container 24 that contains the collected toner and a drum cleaning blade 51 as a cleaning member. The drum cleaning unit 5 scrapes and removes primary transfer residual toner from the surface of the photosensitive drum 1 rotating by means of the drum cleaning blade 51 positioned in contact with the surface of the photosensitive drum 1 and stores it in a drum collection toner container 24.

The toner remaining on the surface of the intermediate transfer belt 8 after the secondary transfer process (secondary transfer residual toner) is removed from the surface of the intermediate transfer belt 8 and collected by the belt cleaning unit 20 as the intermediate transfer cleaning means. The belt cleaning unit 20 has a collected toner container 22 that contains the collected toner and a cleaning blade 21 as a cleaning member. The belt cleaning unit 20 scrapes and removes secondary transfer residual toner from the surface of the rotating intermediate transfer belt 8 by means of the cleaning blade 21 positioned in contact with the surface of the intermediate transfer belt 8 and stores it in the collected toner container 22. In the present embodiment, as the cleaning blade 21, a blade (rubber blade portion) made of rubber as an elastic material is attached to a supporting member. In the present embodiment, the supporting member of the cleaning blade 21 is formed of a galvanized steel sheet with a length of 240 mm and a thickness of 3 mm in the longitudinal direction that is positioned along the width direction of the intermediate transfer belt 8. In the present embodiment, the rubber blade portion of the cleaning blade 21 is formed of a urethane rubber blade with a length of 230 mm, a thickness of 2 mm, and a hardness of 77 degrees according to the JIS K 6253 standard, which is located along the width direction of the intermediate transfer belt 8. In the present embodiment, the cleaning blade 21 is pressed against the tension roller 10 via the intermediate transfer belt 8 with a linear pressure of about 0.49 N/cm. The cleaning blade 21 is positioned in a counter direction to the moving direction of the surface of the intermediate transfer belt 8, that is, its free end portion faces upstream in the moving direction of the surface of the intermediate transfer belt 8, and the edge of the free end portion is pressed against the outer surface (outer circumference) of the intermediate transfer belt 8.

In the present embodiment, in each image forming unit P, the photosensitive drum 1, the charging roller 2, the developing unit 4, and the drum cleaning unit 5 as process means acting thereon, constitute a process cartridge 7 that can be attached to and detached from the main body of the apparatus 110 as an integrated unit. The four process cartridges 7Y, 7M, 7C, and 7K have substantially identical structures, and each contains a different color of toner.

In the present embodiment, the intermediate transfer belt 8, its tension rollers 9 and 10, and each primary transfer roller 6, etc., constitute an intermediate transfer belt unit 40 that can be attached to and detached from the main body of the apparatus 110 as a single unit.

In the present embodiment, the image forming apparatus 100 is capable of performing print operations in two print modes: full-color mode and monochrome mode. The full-color mode is a print mode in which a full-color image can be formed by forming toner images in all four imaging units PY, PM, PC, and PK. Monochrome mode is a print mode in which a black monochrome image can be formed by forming a toner image only with the black imaging unit PK among the four imaging units. In monochrome mode, a toner image is formed only on the photosensitive drum 1K for black. In monochrome mode, only the primary transfer roller 6K for black is brought into contact with the photosensitive drum 1K via the intermediate transfer belt 8, and the primary transfer voltage is applied and the primary transfer current is passed to primary transfer the toner image onto the intermediate transfer belt 8. In monochrome mode, in the image forming units PY, PM, and PC for colors other than black, the primary transfer roller 6 is separated from the photosensitive drum 1, and the intermediate transfer belt 8 is separated from the photosensitive drum 1. In monochrome mode, in the image forming units PY, PM, and PC for colors other than black, the developing roller 41 is separated from the photosensitive drum 1, the rotation of the photosensitive drum 1 and developing roller 41 is stopped, and no charging voltage, developing voltage, or primary transfer voltage is applied. The image forming apparatus 100 is provided with a transfer separation mechanism 93 (FIG. 8), which enables the primary transfer roller 6 to move as described above, and a developing separation mechanism 94 (FIG. 8), which enables the developing roller 41 to move as described above, respectively.

The image forming apparatus 100 is also provided with an environment sensor 70 as an environmental detecting means (environmental detecting portion). The environmental detecting means (environmental detecting portion) need only be capable of acquiring information on at least one of temperature or humidity inside or outside the image forming apparatus 100. In the present embodiment, the environment sensor 70 is configured with a temperature and humidity sensor that can continuously detect the temperature and humidity (relative humidity) inside the main body of the apparatus 110 as the operating environment of the image forming apparatus 100.

2. Control System

Figure 8:
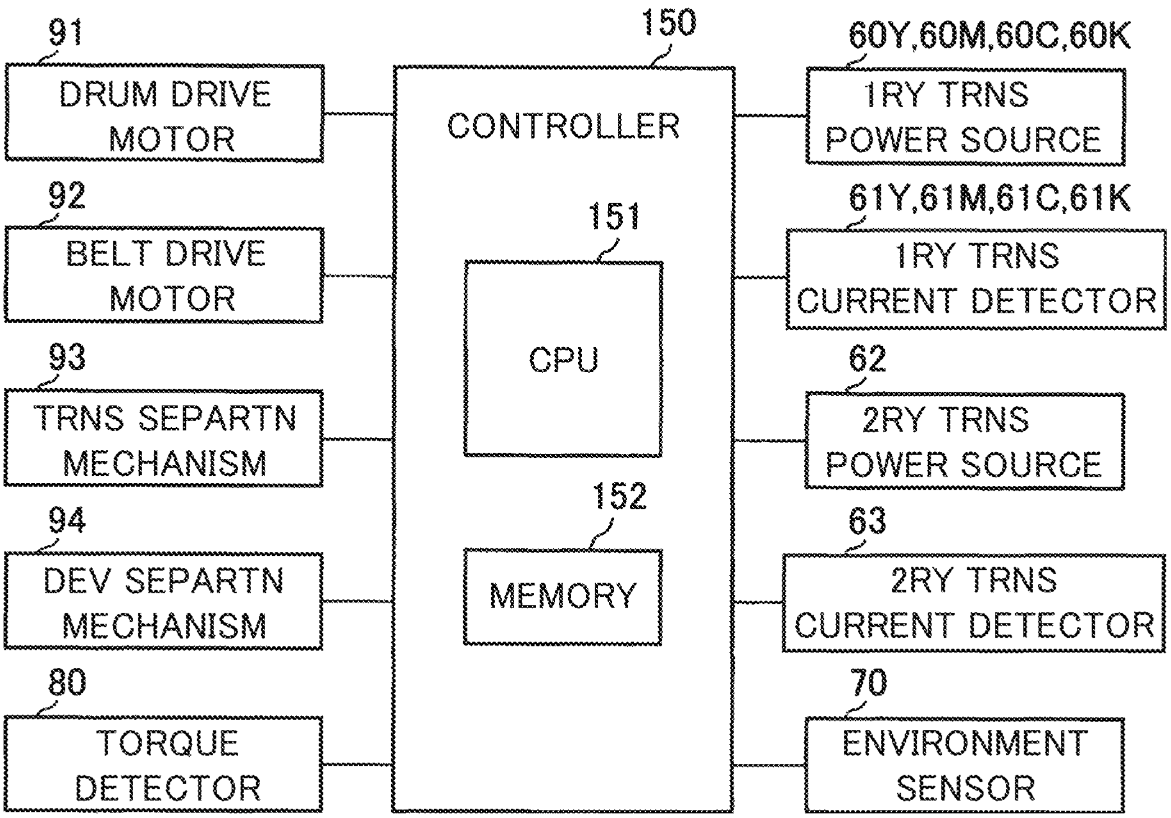
FIG. 8 is a schematic block diagram showing the control scheme of the image forming apparatus.

FIG. 8 is a schematic block diagram showing the control system of the image forming apparatus 100 according to the present embodiment. The image forming apparatus 100 has a control portion 150. The control portion 150 has a CPU 151 as a central element that performs arithmetic processing, a memory (storage element) 152 such as a ROM and RAM as a storage means, and an input/output portion (not shown) that controls the exchange and reception of signals between elements connected to the control portion 150. The RAM stores sensor detection results, calculation results, etc., while the ROM stores control programs, pre-determined data tables, etc.

The control portion 150 is a control means that can comprehensively control the operation of the image forming apparatus 100. Each part of the image forming apparatus 100 is connected to the control portion 150. In the present embodiment, various power sources are connected to the control portion 150, such as, for example, the primary transfer power supply portion 60 and the secondary transfer portion 62. Also connected to the control portion 150 are various detection portions, such as primary transfer current detection circuit 61, secondary transfer current detection circuit 63, and environmental sensor 70. Also connected to the control portion 150 are various driving portions, such as the drum driving motor 91 and the belt driving motor 92. In addition, the aforementioned transfer separation mechanism 93 and developing separation mechanism 94 are also connected to the control portion 150. The control unit 150 can control the operation of the various power supply portions mentioned above (ON/OFF and output values), the operation of the various driving portions and exposure unit 4, and the timing of these operations to perform image forming portion and other operations.

Here, the image forming apparatus 100 is capable of executing a job (print job, print operation), which is a series of operations to form images on a single or multiple recording materials S, initiated by a single start instruction. In the present embodiment, the start instruction is input to the image forming apparatus 100 from an external device such as a personal computer. A job generally has an image forming process (printing process), a pre-rotation process, a paper interval process when images are formed on multiple recording materials S, and a post-rotation process. The image forming process is the period during which an electrostatic latent image is actually formed on the photosensitive drum 1, the electrostatic latent image is developed (toner image formation), the toner image is primarily transferred, the toner image is secondarily transferred, and the toner image is fixed, etc. More precisely, the timing during image formation differs depending on the position at which these processes of forming the electrostatic latent image, forming the toner image, primary transfer of the toner image, secondary transfer of the toner image, and fixing the toner image are performed. The pre-rotation process is a period of time during which preparation operations are performed prior to the image forming process. The paper interval process (image interval process) is a period corresponding to the interval between recording materials S and S when the image forming process is continuously performed for multiple recording materials S (during continuous image forming). The post-rotation process is a period of time during which an organizing operation (preparation operation) is performed after the image forming process. Non-image forming time is a period of time other than during image forming, and includes the above-mentioned pre-rotation process, paper interval process, post-rotation process, and also the pre-rotation process, which is a preparation operation when the power source of the image forming apparatus 100 is turned on or when it returns from sleep mode.

For convenience, FIGS. 1 and 8 show a torque detection unit 80, which is described in embodiment 3, but this need not be provided in the present embodiment.

3. Current Balance Control

Figure 2:
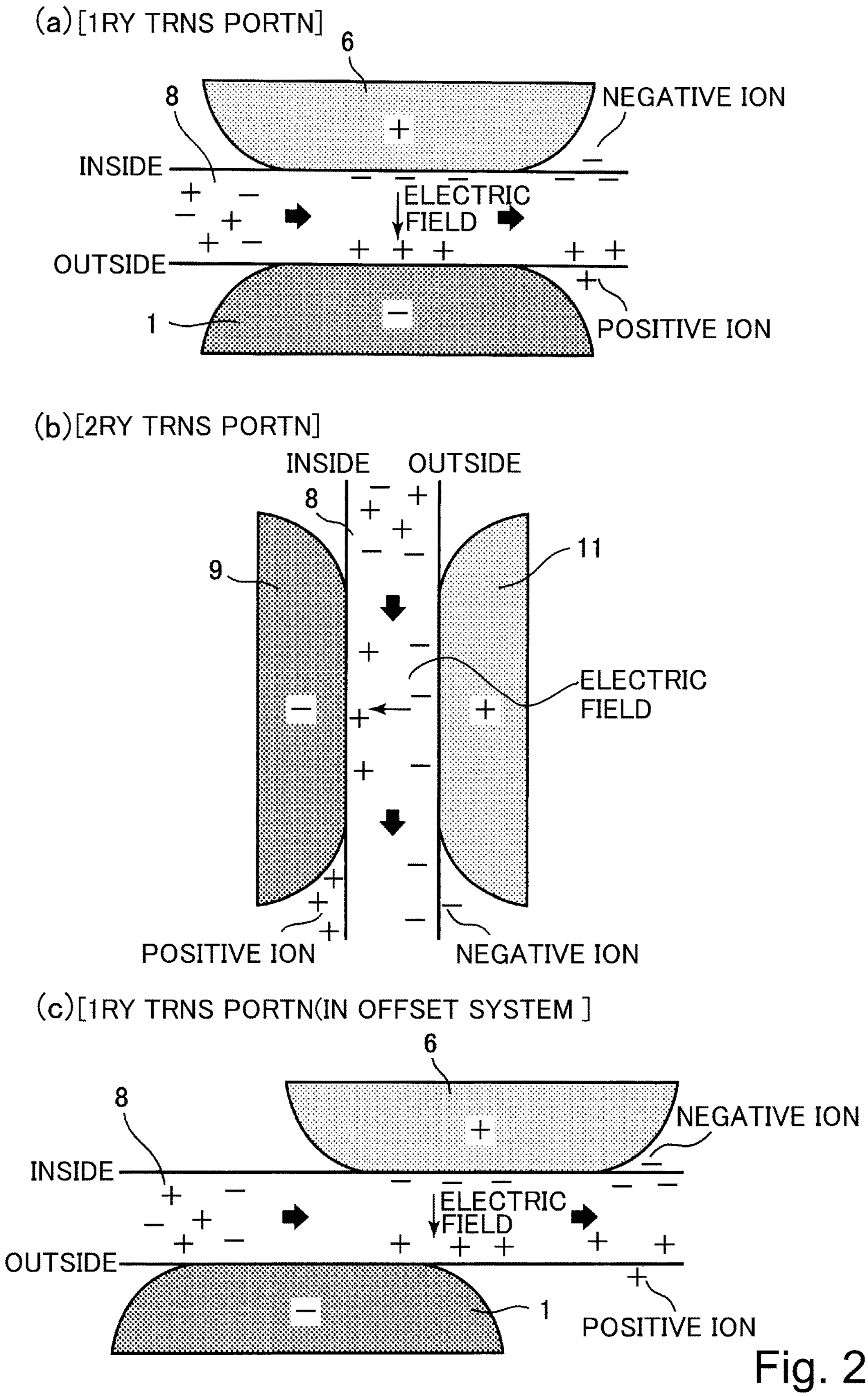
FIG. 2, part (a), part (b) and part (c), is a schematic view of the primary and secondary transfer portions.

The ionic conductive intermediate transfer belt 8 deposits ionic substances on its surface when current is passed through it. This is caused by the electric field generated in the intermediate transfer belt 8, which forces the cations and anions responsible for ion conductivity to move in the direction of the electric field, while the anions move in the opposite direction of the electric field. FIG. 2, part (a), part (b) and part (c), is a schematic view of the primary transfer portion N1 and secondary transfer portion N2 and shows the movement of the ionic conductive material.

As shown in FIG. 2 (*a*), in the primary transfer portion N1, a voltage of positive polarity is applied from the primary transfer roller 6, which is in contact with the inner (inner circumferential side) of the intermediate transfer belt 8, and an electric field is generated in the direction from the inner to the outer (circumferential side) of the belt 8. The generated electric field causes the cations in the intermediate transfer belt 8 to move to the outside of the intermediate transfer belt 8 and the anions to move to the inside.

As shown in FIG. 2 (*b*), in the secondary transfer portion N2, a voltage of positive polarity is applied from the secondary transfer roller 11, which contacts the outside of the intermediate transfer belt 8, and an electric field is generated in the direction from the outside to the inside of the intermediate transfer belt 8. The generated electric field causes the cations in the intermediate transfer belt 8 to move to the inside of the intermediate transfer belt 8 and the anions to move to the outside.

The primary transfer roller 6 and photosensitive drum 1, and the secondary transfer roller 11 and driving roller 9 do not have to be directly opposite each other. Even if the primary transfer roller 8 and photosensitive drum 1, and the secondary transfer roller 11 and driving roller 9 are positioned at offset positions (off-center position in the moving direction of the intermediate transfer belt 8), they shall be included in opposing positions if an electric field is formed between them. For example, FIG. 2 (*c*) shows the primary transfer portion N1 in the offset system. The migration of ions is the same as in FIG. 2 (*a*).

When the balance of the current to the intermediate transfer belt 8 is greatly disrupted, ionic substances deposit on the surface of the intermediate transfer belt 8. This deposited substance increases the frictional force between the intermediate transfer belt 8 and the cleaning blade 21. The control of the current balance (adjustment operation) in the present embodiment uses this characteristic of the ionic conductive intermediate transfer belt 8 to control the frictional force between the intermediate transfer belt 8 and the cleaning blade 21.

In the present embodiment, the ionic substance contained in the intermediate transfer belt 8 is potassium ion for the cation and perfluorobutane sulfonate ion for the anion. Either the cation or the anion can be deposited on the outer surface of the intermediate transfer belt 8 to increase the frictional force between the intermediate transfer belt 8 and the cleaning blade 21. In the present embodiment, the method of depositing cations on the outer surface of the intermediate transfer belt 8 was chosen. The reason for this is that cations have a smaller molecular weight than anions, so they are more easily deposited on the outer surface of the intermediate transfer belt 8 and are more effective in increasing the frictional force between the intermediate transfer belt 8 and the cleaning blade 21.

In the present embodiment, the current balance is defined as follows. First, the direction of the current flowing from the inside to the outside of the intermediate transfer belt 8 is defined as positive, and the direction of the current flowing from the outside to the inside is defined as negative. In the present embodiment, the current flows between the inside and outside of the intermediate transfer belt 8 in the primary transfer portion N1 and the secondary transfer portion N2 as described above. Therefore, in the present embodiment, the total value (added value) of the current flowed to the intermediate transfer belt 8 by the primary transfer roller 6 and the secondary transfer roller 11 per 100 prints using letter-size recording material S (the same hereinafter) is determined as follows. In other words, the positive added value (integrated value), which is the current that flowed from the inside to the outside of the intermediate transfer belt 8 multiplied by the time the current flowed, and the negative added value, which is the current that flowed from the outside to the inside of the intermediate transfer belt 8 multiplied by the time the current flowed, are added together. The total value is then divided by the area of the intermediate transfer belt 8, and the value converted per unit area is defined as the current balance.

Figure 3:
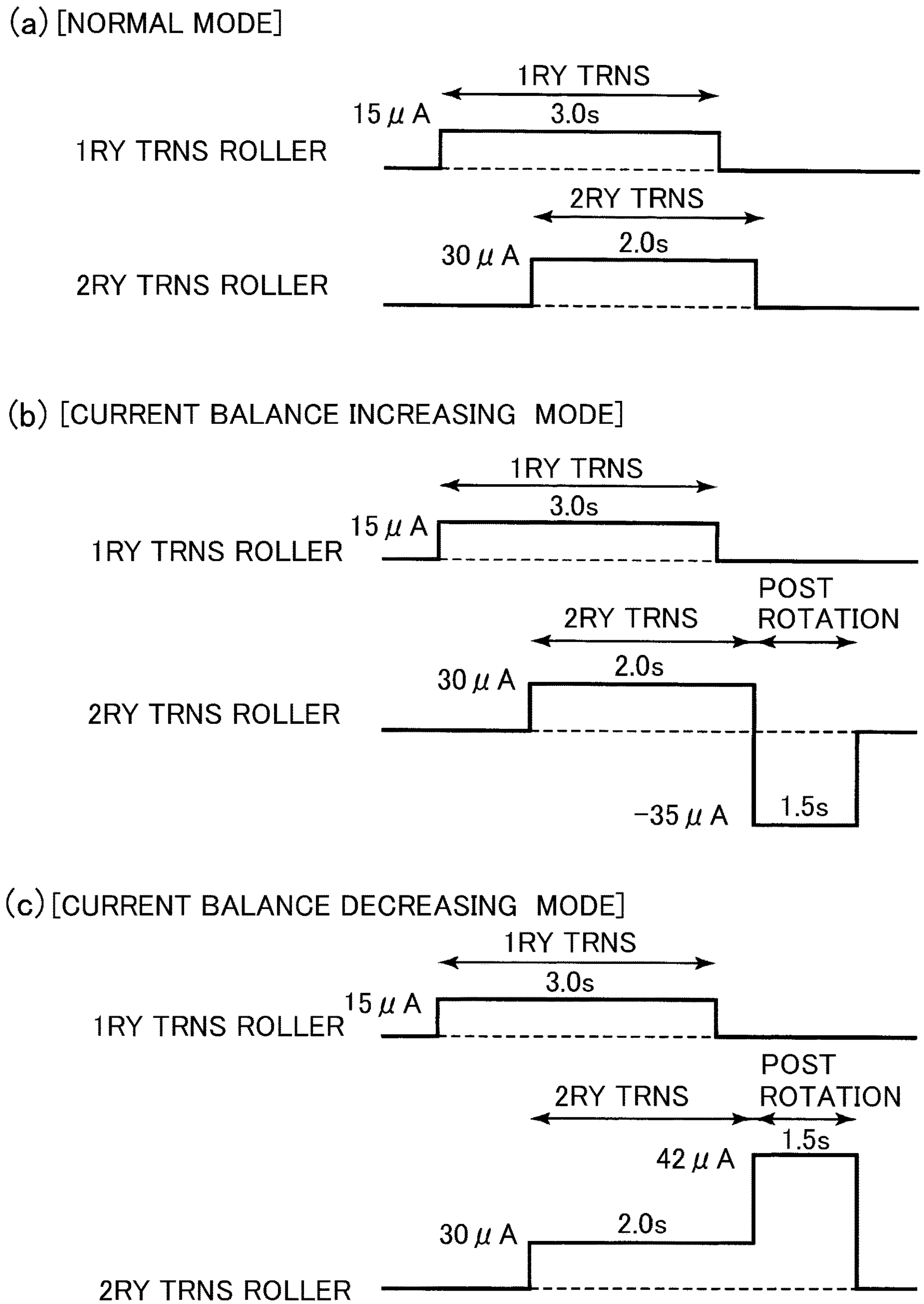
FIG. 3, part (a), part (b) and part (c), is a sequence chart of the primary and secondary transfer currents in monochrome mode.

FIG. 3 (*a*) shows a sequence chart of the primary and secondary transfer currents when a single print in monochrome mode is executed in normal mode as described below. Here, using the case of printing in monochrome mode and normal mode shown in FIG. 3 (*a*) as an example, how the current balance is calculated is explained specifically. The primary transfer current is 15 μA for 3 seconds, so 45 μC flows per printed sheet. The secondary transfer current is 30 μA for 2 seconds, so −60 μC flows per print. Therefore, the total current per printed sheet is −15 μC. The integrated value of the current per 100 prints is −1500 μC. The value obtained by dividing the total current per 100 prints by the surface area of the intermediate transfer belt 8 (0.1975 [$m^2$]) is −7594 [$\mu C/m^2$], which is the current balance. The current balance per 100 prints, as described above, is defined as the current balance in the present embodiment.

Next, the current balance increase mode and current balance decrease mode, which are print modes for controlling current balance, are explained. In the present embodiment, the image forming apparatus 100 is capable of performing print operations in the normal mode, in which no current balance control is performed, and in the above-mentioned current balance increase mode and current balance decrease mode, in which current balance is controlled, as print modes. In particular, in the present embodiment, the image forming apparatus 100 is capable of performing print operations in either of the above-mentioned normal mode, current balance increase mode, and current balance decrease mode by the control described below, whether the print operation is performed in the aforementioned monochrome mode or full-color mode.

FIG. 3, part (a), part (b) and part (c), is a sequence chart of the primary transfer current and secondary transfer current when a single print in monochrome mode is executed in normal mode, current balance increase mode, and current balance decrease mode. FIG. 3, part (a), part (b) and part (c), shows the current flowing to the primary transfer roller 6 (positive current direction from the primary transfer roller 6 side to the intermediate transfer belt 8 side) and the current flowing to the secondary transfer roller 11 (positive current direction from the secondary transfer roller 11 side to the intermediate transfer belt 8 side).

FIG. 3 (*a*) shows the case of printing in monochrome mode and normal mode, as described above.

FIG. 3 (*b*) shows the case of printing in monochrome mode and current balance increase mode. In addition to the primary transfer current flowing 15 μA and the secondary transfer current flowing 30 μA, the current balance is increased by flowing −35 μA from the secondary transfer roller 11 for 1.5 seconds during the post-rotation after the secondary transfer of the toner image.

FIG. 3 (*c*) shows the case of printing in monochrome mode and current balance decrease mode. In addition to 15 μA of primary transfer current and 30 μA of secondary transfer current, the current balance is reduced by flowing 42 μA from the secondary transfer roller 11 for 1.5 seconds during the post-rotation after the secondary transfer of the toner image.

Figure 4:
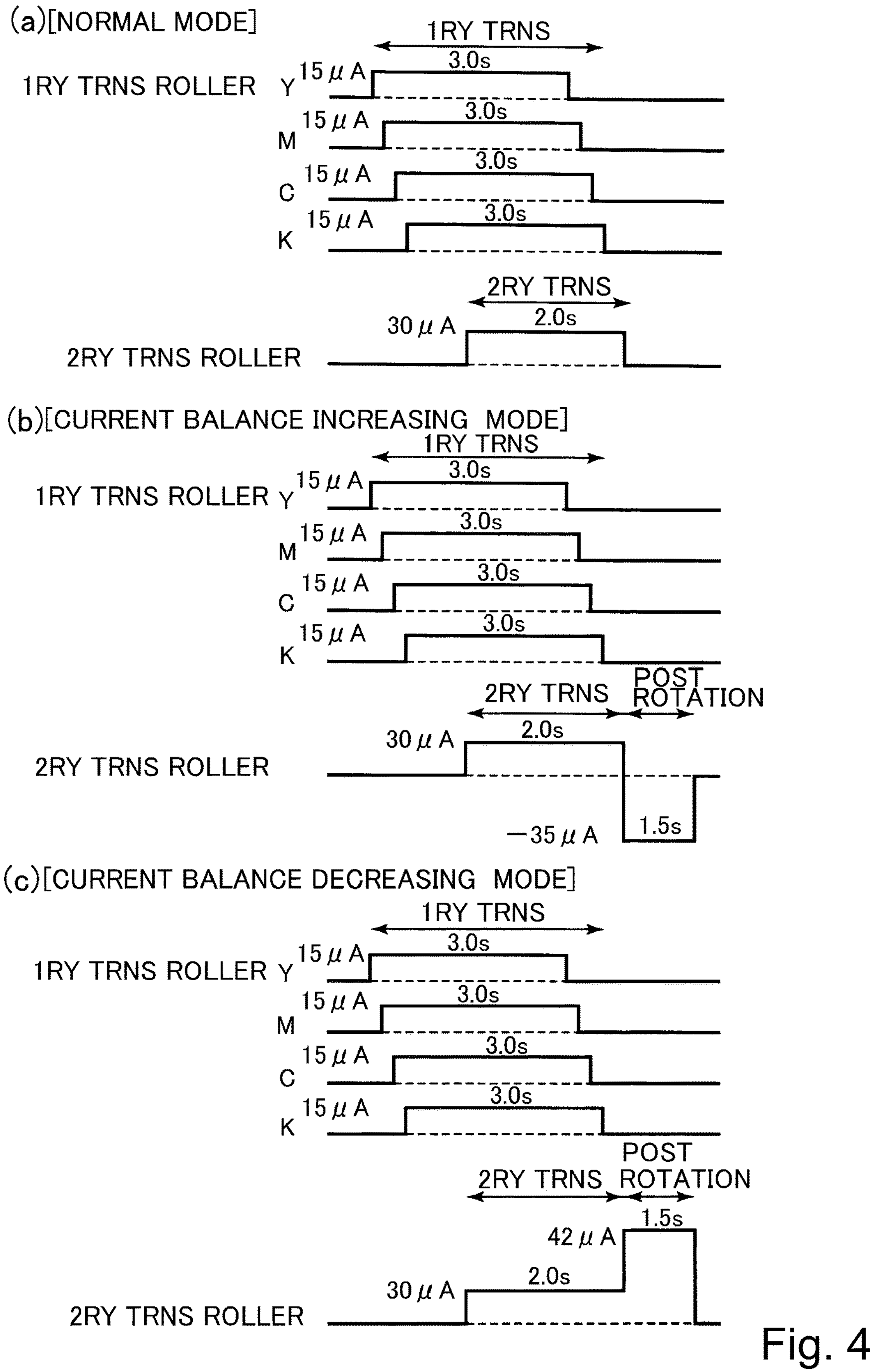
FIG. 4, part (a), part (b) and part (c), is a sequence chart of the primary and secondary transfer currents in full-color mode.

FIG. 4, part (a), part (b) and part (c), shows a sequence chart of the primary transfer current and secondary transfer current when a single print in full-color mode is executed in normal mode, current balance increase mode, and current balance decrease mode. FIG. 4, part (a), part (b) and part (c), shows the current flowing to the primary transfer roller 6 (the direction of the current flowing from the primary transfer roller 6 side to the intermediate transfer belt 8 side is positive) and the current flowing to the secondary transfer roller 11 (the direction of the current flowing from the secondary transfer roller 11 side to the intermediate transfer belt 8 side is positive).

FIG. 4 (*a*) shows the case of printing in full-color mode and normal mode. The primary transfer current is 15 μA and the secondary transfer current is 30 μA in the primary transfer portion N1 for each color.

FIG. 4 (*b*) shows the case of printing in full-color mode and current balance increase mode. In addition to 15 μA of primary transfer current and 30 μA of secondary transfer current in the primary transfer portion N1 for each color, the current balance is increased by flowing −35 μA from the secondary transfer roller 11 for 1.5 seconds during the post-rotation after the secondary transfer of the toner image.

FIG. 4 (*c*) shows the case of printing in full-color mode and current balance decrease mode. In addition to 15 μA of primary transfer current and 30 μA of secondary transfer current in the primary transfer portion N1 for each color, 42 μA is passed from the secondary transfer roller 11 for 1.5 seconds during the post-rotation after the secondary transfer of the toner image, thereby reducing the current balance.

Table 1 shows the occurrence of "cleaning defect" after 200,000 prints (intermittent prints) in monochrome mode each in three different current balance modes at a temperature of 15° C. and humidity of 10% (low temperature and low humidity environment). The current balance was set to 12,000 [$\mu C/m^2$], 15,000 [$\mu C/m^2$], and 16,000 [$\mu C/m^2$] by adjusting the current value passed from the secondary transfer roller 11 in the post-rotation. When the current balance was 12,000 [μC/m²], multiple stripes occurred. When the current balance was 15,000 [μC/m²], one stripe was generated. By increasing the current balance to 16,000 [μC/m²], the occurrence of cleaning defects could be suppressed.

TABLE 1

| Current balance [μC/m²] | Cleaning defect |
|---|---|
| 12000 | x |
| 15000 | Δ |
| 16000 | ○ |

○: No occurrence
Δ: One stripe
x: Multiple stripes

Table 2 shows the occurrence of "squeal (noise)" after printing (intermittent printing) in full-color mode for 200,000 sheets each in three different current balance modes in a temperature of 30° C. and humidity of 80% (high temperature and high humidity environment). The current balance was set to 32,000 [μC/m²], 34,000 [μC/m²], and 36,000 [μC/m²] by adjusting the current value that is passed from the secondary transfer roller 11 in the post-rotation. When the current balance was 36,000 [μC/m²], squealing occurred. When the current balance was 34,000 [μC/m²], squealing occurred, although it was minor. By keeping the current balance to 32,000 [μC/m²], the squealing was suppressed.

TABLE 2

| Current balance [μC/m²] | Squealing |
|---|---|
| 32000 | ○ |
| 34000 | Δ |
| 36000 | x |

○: No occurrence
Δ: Minor squealing
x: Squealing

From the above results, it can be seen that the optimum current balance that can suppress both cleaning defects and squealing is between 16,000 and 32,000 [μC/m²] in the configuration of the present embodiment. Therefore, in the present embodiment, the control shown below is performed so that the current balance is in the above range.

Figure 5:
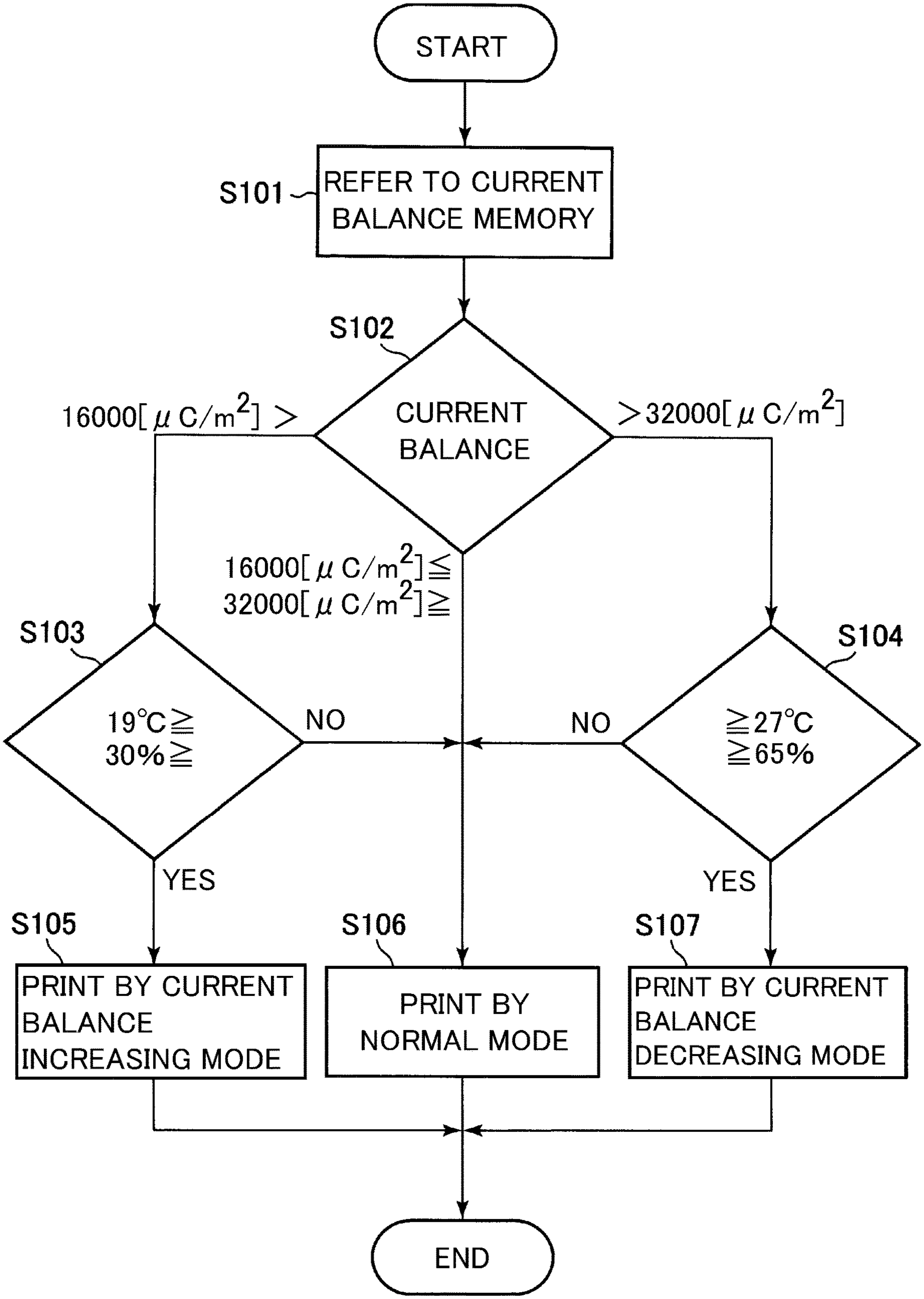
FIG. 5 is a flowchart of the control according to embodiment 1.

FIG. 5 is a flowchart diagram of the control of the present embodiment. First, when the print operation is started, the control portion 150 refers to the current balance for the most recent 100 prints stored in a memory 152 as a memory means (S101). If the number of the most recent prints is less than 100, the value converted to a current balance equivalent to 100 prints is referenced. Next, the control portion 150 determines whether the current balance of the 100 most recent prints is less than 16,000 [μC/m²], greater than 16,000 [μC/m²], less than 32,000 [μC/m²], or greater than 32,000 [μC/m²](S102). If the control portion 150 determines that the current balance is less than 16,000 [μC/m²] in S102, it determines whether the temperature is 19° C. or lower and the humidity is 30% or lower (S103) based on information from the environmental sensor 70 (temperature and humidity detection results). On the other hand, if the control portion 150 determines that the current balance is greater than 32,000 [μC/m²] in S102, it determines whether the temperature is 27° C. or higher and the humidity is 65% or higher (S104) based on the information from the environmental sensor 70 (detection results of temperature and humidity).

If the current balance is less than 16,000 [μC/m²] (S102) and the temperature is below 19° C. and the humidity is below 30% (S103), the control portion 150 controls printing in the current balance increase mode, which includes operations to increase the current balance (S105). If the current balance is less than 16,000 [μC/m²] (S102) and the temperature is not less than 19° C. and the humidity is not less than 30% (S103), the control portion 150 controls printing in normal mode (S106). When the current balance is more than 16,000 [μC/m²] and less than 32,000 [μC/m²] (S102), the control portion 150 controls printing in normal mode (S106). If the current balance is greater than 32,000 [μC/m²] (S102) and the temperature is 27° C. or higher and the humidity is 65% or higher (S104), the control portion 150 controls printing in the current balance decrease mode with operations to decrease the current balance (S107). If the current balance is greater than 32,000 [μC/m²] (S102) and the temperature is not higher than 27° C. and the humidity is not higher than 65% (S104), the control portion 150 controls printing in normal mode (S106).

In the present embodiment, since the current balance is adjusted in post-rotation, the effect may be smaller during continuous printing. However, jobs in which a large amount of continuous printing is performed are relatively rare, and the majority of jobs in the market are used with a mixture of intermittent printing. Therefore, in many cases, the effect of controlling the frictional force between the cleaning blade 21 and the intermediate transfer belt 8 can be fully achieved by adjusting the current balance in post-rotation. Also, for example, in cases where continuous printing jobs are repeated, the operation to increase the current balance in the above current balance increase mode or the operation to decrease the current balance in the above current balance decrease mode at predetermined timing during continuous printing (predetermined number of prints interval, predetermined time interval, etc.) can be performed.

As mentioned above, the cleaning performance of the cleaning blades 21 may correlate with either temperature or humidity. Therefore, in the present embodiment, the control of increasing or decreasing the current balance was determined based on temperature and humidity, but the control of increasing or decreasing the current balance can be determined based on at least one of temperature or humidity.

4. Effectiveness of Current Balance Control

The effects of the control in the present embodiment are explained using Tables 3 and 4.

Embodiment 1-1 is an example to explain the effect of the control in the present embodiment in monochrome mode in a temperature of 15° C. and humidity of 10% environment, and comparative example 1-1 is an example of printing in normal mode without the control in the present embodiment. Embodiment 1-2 is an example to explain the effect of the control in the present embodiment in full-color mode in a 30° C. temperature and 80% humidity environment, and comparative example 1-2 is an example of printing in normal mode without the control in the present embodiment. In the present embodiment, after switching the print mode according to the current balance and environment, the printer continued to print in that print mode.

Table 3 shows the results of the current balance of comparative example 1-1 and embodiment 1-1 and the occurrence of "cleaning defect" at 200,000 prints (intermittent printing). In comparative example 1-1, the current balance was −7594 [μC/m²] and a cleaning defect occurred. In embodiment 1-1, the control in the present embodiment was able to suppress the occurrence of cleaning defects by biasing the current balance to 18987 [μC/m²].

Table 4 shows the results of the current balance and the occurrence of "squealing" at 200,000 prints (intermittent printing) for comparative example 1-2 and embodiment 2. In comparative example 1-2, the current balance was 60759 [μC/m²] and squealing occurred. In embodiment 1-2, the control in the present embodiment was able to keep the current balance within an appropriate range of 28861 [μC/m²], thereby suppressing the occurrence of squealing.

TABLE 3

| | Current balance [μC/m²] | Cleaning defect |
|---|---|---|
| Comparative example 1-1 | −7594 | x |
| Embodiment 1-1 | 18987 | ○ |

○: No occurrence
x: Occurrence

TABLE 4

| | Current balance [μC/m²] | Squealing |
|---|---|---|
| Comparative example 1-2 | 60759 | x |
| Embodiment 1-2 | 28861 | ○ |

○: No occurrence
x: Occurrence

Although the specific range of the current balance preferred in the present embodiment is described in the present embodiment, the present invention is not limited to the range of the current balance in the present embodiment.

For example, the appropriate range should be adjusted according to the material of the intermediate transfer belt used, the ion conductive material, the surface layer material, and the thickness and physical properties of the base material and surface layer. However, when using a general ion-conductive intermediate transfer belt, the current balance should be in the range of 16,000 to 32,000 [μC/m²], and it is more preferable to aim for the center of that range.

Thus, in the present embodiment, the image forming apparatus 100 has an image carrier 1 that carries a toner image, an intermediate transfer unit 8 in the form of an ion-conductive, rotatable, non-endless belt, and a primary transfer member 6 that performs primary transfer of the toner image from the image carrier 1 to the intermediate transfer unit 8 in the primary transfer portion N1. It also has a secondary transfer member 11 that performs a secondary transfer of the toner image from the intermediate transfer unit 8 to the recording material S in the secondary transfer portion N2, a cleaning member 21 that contacts the outer surface of the intermediate transfer unit 8 to remove adhesions on the outer surface of the intermediate transfer unit 8, and an environmental detection portion 70 that detects at least one of temperature or humidity of the environment. In addition, based on the detection results of the environmental detection portion 70, the control portion 150 controls the current balance based on the integrated value of the current flowing from the inside to the outside of the intermediate transfer unit 8 and the current flowing from the outside to the inside of the intermediate transfer unit 8, to change the current balance. The control portion 150 can be controlled to perform at least one of an adjustment operation to increase the absolute value of the above current balance or an adjustment operation to decrease the absolute value of the above current balance.

In the present embodiment, the control portion 150 controls to increase the absolute value of the above current balance when at least one of the temperature or humidity indicated by the detection result of the environmental detection portion 70 is lower than that of the predetermined environment. In the present embodiment, the control portion 150 further controls to increase the absolute value of the above current balance based on the above current balance in the past predetermined period. In particular, in the present embodiment, the control portion 150 controls to increase the absolute value of the above current balance when at least one of the temperature or humidity indicated by the detection result of the environmental detection portion 70 is lower than that of the predetermined environment and when the absolute value of the above current balance in the past predetermined period is lower than the predetermined value. In the present embodiment, the control portion 150 controls to decrease the absolute value of the above current balance when at least one of the temperature or humidity indicated by the detection result of the environmental detection portion 70 is higher than that of the predetermined environment. In the present embodiment, the control portion 150 further controls to decrease the absolute value of the above current balance based on the above current balance in the past predetermined period. In particular, in the present embodiment, the control portion 150 controls to decrease the absolute value of the above current balance when at least one of the temperature or humidity indicated by the detection result of the environmental detection portion 70 is higher than that of the predetermined environment and the absolute value of the above current balance in the past predetermined period is higher than the predetermined value.

In the present embodiment, the control unit 150 controls the secondary transfer voltage applying portion 62, which applies voltage to the secondary transfer member 11 during the period when the toner image is not being transferred from the intermediate transfer unit 8 to the recording material S in the secondary transfer portion N2, to change the above current balance. In this case, the secondary transfer member 11 and the secondary transfer voltage applying portion 62 constitute the adjustment portion that adjusts the above current balance. As described below, the control unit 150 may control the primary transfer voltage applying portion 60 that applies voltage to the primary transfer member 6 during the period when the toner image is not transferred from the image carrier 1 to the intermediate transfer unit 8 in the primary transfer portion N1 to change the above current balance. In this case, the primary transfer member 6, primary transfer voltage applying portion 60, and the like constitute the adjustment portion that adjusts the above current balance. In the present embodiment, the intermediate transfer material contains an alkali metal salt as an ion-conductive material that exhibits ion conductivity. In the present embodiment, the cleaning member is a cleaning blade that faces in a counter direction to the rotation direction of the intermediate transfer unit 8 and contacts the outer surface of the intermediate transfer unit 8.

As explained above, according to the present embodiment, a simple configuration can maintain a stable frictional force between the cleaning blade 21 and the intermediate transfer belt 8, and maintain a stable cleaning performance of the cleaning blade 21. In addition, according to the present embodiment, the stable cleaning performance can be maintained without increasing the contact pressure of the cleaning blade 21, thereby extending the lifetime of the cleaning unit.

Next, other embodiments of the present invention are described. The basic configuration and operation of the image forming apparatus in the present embodiment are the same as those of the image forming apparatus in embodiment 1. Therefore, elements of the image forming apparatus in the present embodiment that have the same or corresponding functions or configuration examples as those of the image forming apparatus in embodiment 1 are marked with the same symbols as in embodiment 1, and detailed explanations are omitted.

1. Overview of the Present Embodiment

In monochrome mode, the primary transfer current flows only for one primary transfer roller 6, whereas in full color mode, the primary transfer current flows for four primary transfer rollers 6. Therefore, the current balance differs greatly between the monochrome mode and the full-color mode. In other words, the current balance in the full-color mode is significantly positively biased against the current balance in the monochrome mode. Therefore, in the present embodiment, instead of the step (S102 in FIG. 5) to determine the control of increasing or decreasing the current balance based on the current balance of the last 100 prints in embodiment 1, the control of increasing or decreasing the current balance is determined based on whether the monochrome mode or the full-color mode is used.

2. Current Balance Control

Figure 6:
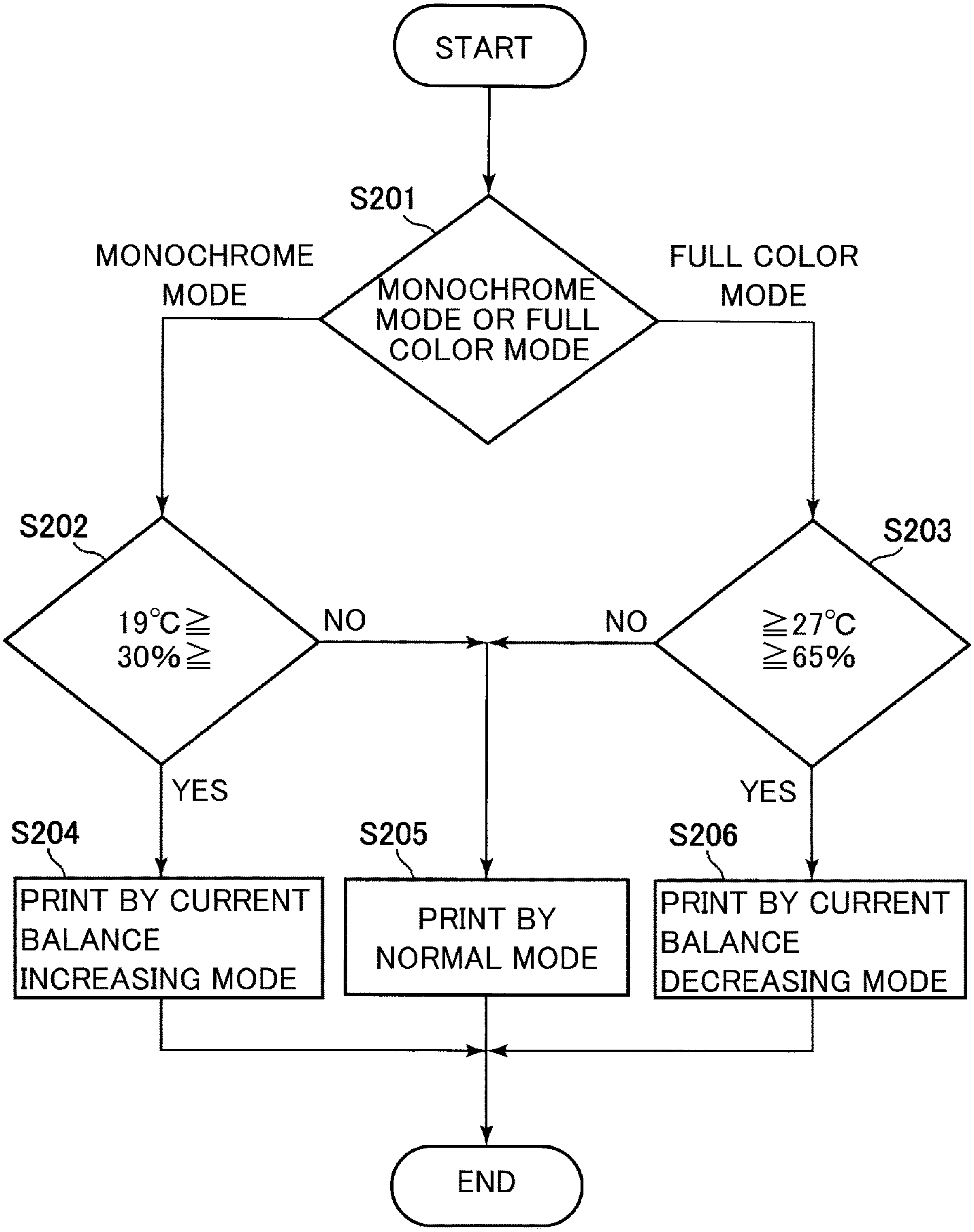
FIG. 6 is a flowchart of the control according to embodiment 2.

FIG. 6 is a flowchart of the control of the present embodiment. First, when the print operation is started, the control portion 150 determines whether the mode is monochrome or full-color mode (S201). If the control portion 150 determines that the mode is monochrome mode in S201, it determines whether the temperature is 19° C. or lower and the humidity is 30% or lower (S202) based on information from the environmental sensor 70 (temperature and humidity detection results). On the other hand, if the control portion 150 determines that it is in full-color mode in S201, it determines whether the temperature is 27° C. or higher and the humidity is 65% or higher (S203) based on the information (detection results of temperature and humidity) from the environmental sensor 70.

When it is monochrome mode (S201) and the temperature is 19° C. or lower and the humidity is 30% or lower (S202), the control portion 150 controls printing in the current balance increase mode, which includes an operation to increase the current balance (S204). If the control portion 150 is in monochrome mode (S201) and the temperature is not 19° C. or lower and the humidity is not 30% or lower (S202), it controls printing in normal mode (S205). If the control portion 150 is in full-color mode (S201) and the temperature is 27° C. or higher and the humidity is 65% or higher (S203), it controls printing in the current balance decrease mode, which includes an operation to decrease the current balance (S206). If the control portion 150 is in full-color mode (S201) and the temperature is not 27° C. or higher and the humidity is not 65% or higher (S203), it controls the printing in normal mode (S205).

3. Effects of Current Balance Control

According to the present embodiment, the same effect as in embodiment 1 shown in Tables 3 and 4 was obtained. In other words, when printing in normal mode without the control in the present embodiment in monochrome mode, a cleaning defect occurred at 200,000 prints (intermittent printing). In contrast, when the control in the present embodiment was performed in monochrome mode, the cleaning defect could be suppressed by biasing the current balance. In addition, when printing in normal mode without the control in the present embodiment in full-color mode, squealing occurred at the time of 200,000 prints (intermittent printing). In contrast, when the control in the present embodiment was performed in full-color mode, the squealing could be suppressed by keeping the current balance within an appropriate range.

Although the present embodiment describes a specific range of current balance that is preferred in the configuration of the present embodiment, the present invention is not limited to the range of current balance in the present embodiment, just as it was described in embodiment 1.

Thus, in the present embodiment, the control portion 150 controls to increase the absolute value of the current balance of the current flowing to the intermediate transfer unit 8 based on the detection result of the environmental detection portion 70 and further based on whether the full-color mode or monochrome mode is used. In particular, in the present embodiment, the control portion 150 controls to increase the absolute value of the above current balance when at least one of the temperature or humidity indicated by the detection result of the environmental detection portion 70 is lower than that of the predetermined environment and when the monochrome mode is selected. In the present embodiment, the control portion 150 controls to decrease the absolute value of the above current balance based on the detection result of the environmental detection portion 70 and further based on whether the full-color mode or the monochrome mode is used. In particular, in the present embodiment, the control portion 150 controls to decrease the absolute value of the above current balance when at least one of the temperature or humidity indicated by the detection result of the environmental detection portion 70 is higher than that of the predetermined environment and when the full-color mode is selected.

Next, another embodiment of the present invention is described. The basic configuration and operation of the image forming apparatus in the present embodiment are the same as those of the image forming apparatus in embodiment 1. Therefore, elements of the image forming apparatus in the present embodiment that have the same or corresponding functions or configuration examples as those of the image forming apparatus in embodiment 1 are marked with the same symbols as in embodiment 1, and detailed explanations are omitted.

1. Overview of the Present Embodiment

In the image forming apparatus 100 according to the present embodiment, the torque detection circuit portion 80 (FIGS. 1 and 8) as a torque detection means detects the rotational torque of the belt driving motor 92 that drives the driving roller 9, which is highly correlated with the frictional force between the cleaning blade 21 and the intermediate transfer portion 8. The torque detection circuit portion 80 inputs a signal indicating the detection result of the rotational torque of the belt driving motor 92 to the control portion 150. When the torque falls below the standard, the frictional force between the cleaning blade 21 and the intermediate transfer belt 8 is increased by increasing the current balance to suppress cleaning defects. When the torque is above the standard, the frictional force between the cleaning blade 21 and the intermediate transfer belt 8 is reduced by decreasing the current balance to suppress squealing.

For example, any available torque detection method from the public domain can be used as the torque detection method. For example, the torque detection portion 80 can detect the torque current component that generates torque in the stepping motor comprising the belt driving motor 92. In this way, the torque detection portion 80 can detect the motor torque generated in the belt driving motor 92 that correlates with the driving torque of the driving roller 9 (intermediate transfer belt 8). Without limitation, the motor torque can be detected based on the torque current component in vector control for a stepping motor, and the motor torque can be detected by detecting its current value or PWM value of voltage for a DC brushless motor.

2. Current Balance Control

Table 5 shows the relationship between the driving torque of the belt driving motor 92 during printing operation (during rotation of the intermediate transfer belt 8) and the occurrence of cleaning defects in a 15° C. temperature and 10% humidity environment (low temperature and low humidity environment). The average value per second is used as the drive torque (the same applies hereinafter).

When the drive torque was 0.049 [N·m], a cleaning defect occurred. On the other hand, when the drive torque was 0.059 [N·m], no cleaning defects occurred.

TABLE 5

| Drive torque [N · m] at a temperature of 15° C. and humidity of 10% | Cleaning defects |
|---|---|
| 0.049 | x |
| 0.059 | ○ |

○: No occurrence,
x: Occurrence

Table 6 shows the relationship between the drive torque of the driving motor 92 of the belt driving motor during printing operation at a temperature of 30° C. and humidity of 80% (high temperature and high humidity environment) and the occurrence of squealing. When the drive torque was 0.098 [N·m], squealing occurred. On the other hand, when the drive torque was 0.088 [N·m], no squealing occurred.

TABLE 6

| Drive torque [N · m] at a temperature of 30° C. and humidity of 80% | Squealing |
|---|---|
| 0.088 | ○ |
| 0.098 | x |

○: No occurrence,
x: Occurrence

From the above results, it can be seen that in the configuration of the present embodiment, the optimum drive torque that can suppress both cleaning defects and squealing is 0.059 to 0.088 [N·m]. Therefore, in the present embodiment, the control shown below is performed so that the drive torque is within the above range.

Figure 7:
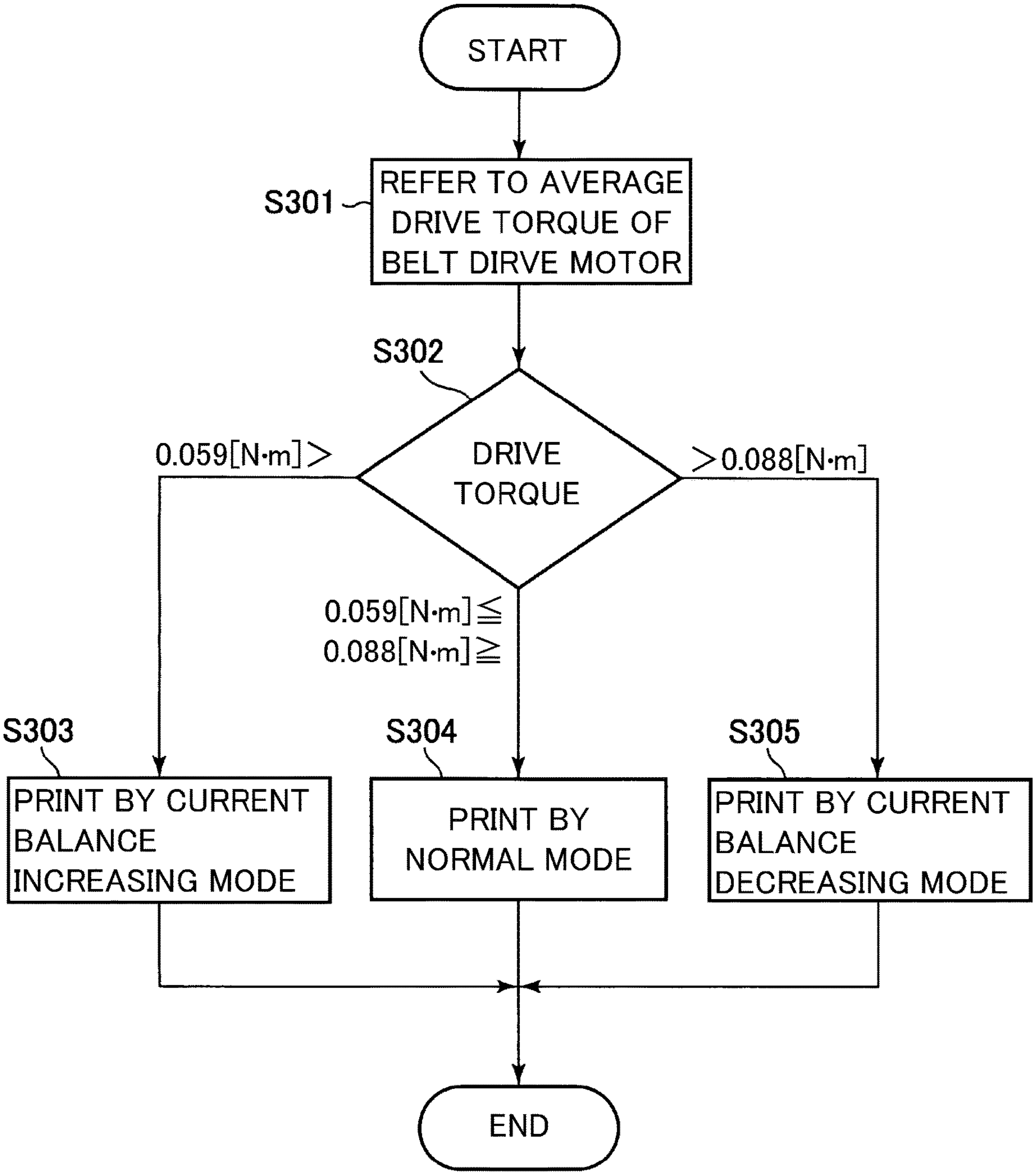
FIG. 7 is a flowchart of the control according to embodiment 3.

FIG. 7 is a flowchart of the control of the present embodiment. The control portion 150 refers to the average drive torque per second of the belt driving motor 92 (also referred to here simply as "drive torque") detected by the torque detection portion 80 during the printing operation (S301). Next, the control portion 150 determines whether the driving torque is less than 0.059 [N·m], greater than 0.059 [N·m], less than 0.088 [N·m], or greater than 0.088 [N·m] (S302).

When the drive torque is less than 0.059 [N·m] (S302), the control portion 150 controls printing in the current balance increase mode, which includes an operation to increase the current balance (S303). When the drive torque is more than 0.059 [N·m] and less than 0.088 [N·m] (S302), the control portion 150 controls printing in the normal mode (S304). If the drive torque is greater than 0.088 [N·m] (S302), the control portion 150 controls printing in the current balance decrease mode, which includes an operation to decrease the current balance (S305).

Furthermore, in the present embodiment, the control portion 150 repeats the above flowchart at each predetermined number of prints or at each predetermined time during the print operation, and periodically switches the print mode.

The control of increasing or decreasing the current balance performed in post-rotation may be determined by using a representative value as the rotation torque of the belt driving motor 92 during printing operation, for example, the rotation torque when the last image of the job is being formed on the intermediate transfer belt 8.

3. Effects of Current Balance Control

The effects of the control in the present embodiment are explained using Tables 7 and 8.

Embodiment 3-1 is an example to explain the effect of the control in the present embodiment in monochrome mode in a temperature of 15° C. and humidity of 10% environment, and comparative example 3-1 is an example of printing in normal mode without the control in the present embodiment. Embodiment 3-2 is an example to explain the effect of the control in the present embodiment in full-color mode in a temperature of 30° C. and humidity of 80%, and comparative example 3-2 is an example of printing in normal mode without the control in the present embodiment.

Table 7 shows the results of the drive torque and the occurrence of cleaning defects at 200,000 prints (intermittent printing) for the comparative example 3-1 and embodiment 3-1. In the comparative example 3-1, the drive torque was 0.046 [N·m] and a cleaning defect occurred. In embodiment 3-1, when the drive torque dropped below the threshold value, the current balance was increased to raise the drive torque to 0.059 [N·m] above the threshold value, thereby preventing the occurrence of a cleaning defect.

Table 8 shows the results of drive torque and the occurrence of squealing at 200,000 prints (intermittent printing) for the comparative example 3-2 and embodiment 3-2. In the comparative example 3-2, the drive torque was 0.100 [N·m] and squealing occurred. In embodiment 3-2, when the drive torque exceeded the threshold value, the drive torque was reduced to 0.088 [N·m] below the threshold value by decreasing the current balance, thereby suppressing the occurrence of squealing.

TABLE 7

| | Drive torque [N · m] at a temperature of 15° C. and humidity of 10% | Cleaning defect |
|---|---|---|
| Comparative example 3-1 | 0.046 | x |
| Embodiment 3-1 | 0.059 | ○ |

○: No occurrence,
x: Occurrence

TABLE 8

| | Drive torque [N · m] at a temperature of 30° C. and humidity of 80% | Squealing |
|---|---|---|
| Comparative example 3-2 | 0.046 | x |
| Embodiment 3-2 | 0.059 | ○ |

○: No occurrence,
x: Occurrence

In the present embodiment, the drive torque of the belt driving motor 92, which is highly correlated with the frictional force between the cleaning blade 21 and the intermediate transfer belt 8, can be monitored to more accurately control cleaning defects and squealing.

Although the specific range of drive torque preferred in the present embodiment is described in the present embodiment, the present invention is not limited to the range of drive torque in the present embodiment. For example, it can be adjusted to an appropriate range depending on the intermediate transfer belt material used, ion conductive material, surface layer material, thickness and physical properties of the base material and surface layer, etc. However, when using a general ion conductive intermediate transfer belt and cleaning blade, the drive torque should be in the range of 0.059-0.088 [N·m], and aiming for the center of that range is more preferable.

Thus, in the present embodiment, the image forming apparatus 100 has a torque detection portion 80 that detects the rotational torque of the motor 92 driving the intermediate transfer unit 8. It also has a control portion 150 that controls to change the current balance based on the integrated value of the current flowing from the inside to the outside of the intermediate transfer unit 8 and the current flowing from the outside to the inside of the intermediate transfer unit 8, based on the detection results of the torque detection portion 80. The control portion 150 can control to perform at least one of an adjustment operation to increase the absolute value of the above current balance or an adjustment operation to decrease the absolute value of the above current balance. In the present embodiment, the control portion 150 controls to increase the absolute value of the above current balance when the rotational torque of the motor 92 indicated by the torque detection portion 80 is less than a predetermined value. In the present embodiment, the control portion 150 controls to decrease the absolute value of the above current balance when the rotational torque of the motor 92 indicated by the detection result of the torque detection portion 80 is greater than the predetermined value.

As explained above, the present embodiment has the same effect as in embodiment 1 and can suppress cleaning defects and squealing with greater precision.

Although the present invention has been described above in terms of specific embodiments, the present invention is not limited to this.

In the embodiments presented above, a secondary transfer roller 11 was used to control adjusting the current balance of the intermediate transfer belt 8, but a primary transfer roller 6 may also be used to control adjusting the current balance of the intermediate transfer belt 8. Specifically, for example, in embodiment 1-1, a positive primary transfer current is applied during post-rotation, and in embodiment 1-2, a negative primary transfer current is applied during post-rotation. The primary transfer current should be controlled accordingly for the other embodiments. The current supplying members that supply current to the intermediate transfer portion, which constitute the adjustment portion for adjusting the current balance, are not limited to secondary transfer members or primary transfer members. For example, opposing roller pairs and other current supplying members and voltage applying portions that apply voltage to the current supplying members can be separately provided, such as opposing rollers arranged to be able to hold the intermediate transfer unit between the rollers. This can then be used to perform the operation of increasing and decreasing the current balance in the same manner as in the above embodiments. These can also be used together.

In the above embodiments, the current balance of the intermediate transfer belt 8 was adjusted during post-rotation, but the current balance of the intermediate transfer belt 8 can be adjusted during non-image formation. For example, the current balance adjustment of the intermediate transfer belt 8 may be performed during pre-rotation or during downtime (the period when image forming is not being performed for other adjustment controls such as image density control), or both of these may be used together.

In the above embodiments, the current balance was biased positively to deposit cations on the outer surface of the intermediate transfer belt 8 in order to increase the friction force, but it may be biased negatively to deposit anions on the outer surface of the intermediate transfer belt 8.

In the above embodiments, a secondary transfer roller (secondary transfer outer roller) as the secondary transfer member is used to apply voltage to it, and a driving roller (secondary transfer inner roller) as the opposing member is electrically grounded, but this is not this to be limiting. The secondary transfer opposing roller can be electrically grounded by using the secondary transfer inner roller as the secondary transfer member and applying voltage to it and using the secondary transfer opposing roller as the opposing member. In this case, during the secondary transfer process, a secondary transfer voltage of the same polarity as the normal charging polarity of the toner should be applied to the secondary transfer inner roller. And even in such a configuration, the voltage applied to the secondary transfer inner roller can be controlled to increase or decrease the current balance operation.

The above embodiments described a case in which three modes are selected for current balance adjustment: normal mode, current balance increase mode, and current balance decrease mode, but this is not this to be limiting. For example, multiple levels of current balance, environment, or torque thresholds may be established, and at least one of the current balance increase mode or current balance decrease mode may be a multi-level mode with different amounts of current balance adjustment.

In addition, when the cleaning member is a cleaning blade, the present invention is particularly effective because the cleaning performance is easily degraded and noises are easily generated due to changes in the frictional force between the cleaning member and the intermediate transfer unit. However, the present invention can be applied not only when the cleaning member is a blade-shaped member, but also when the cleaning member is in any form in which the above defects may occur due to changes in the frictional force between the cleaning member and the intermediate transfer unit caused by changes in the environment or the like. Such other forms of cleaning members include, for example, pad-shaped, sheet-shaped, or brush-shaped members.

According to the present invention, cleaning performance can be maintained in a configuration with a cleaning member in contact with the surface of the intermediate transfer unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205614, filed Dec. 17, 2021, which is hereby incorporated by reference herein in its entirety.

What is claimed is:

1. An image forming apparatus comprising:

an image bearing member configured to bear a toner image;

an intermediary transfer member having ion conductivity and a rotatable endless belt shape;

a primary transfer member configured to primary-transfer the toner image from the image bearing member to the intermediary transfer member at a primary transfer portion;

a secondary transfer member configured to secondary-transfer the toner image from the intermediary transfer member to a recording material at a secondary transfer portion;

a cleaning member configured to remove deposited matter from an outer surface of the intermediary transfer member by contacting the outer surface of the intermediary transfer member, the cleaning member including a cleaning blade contacting the outer surface of the intermediary transfer member in a counter direction with respect to a rotational direction of the intermediary transfer member;

an environmental sensor configured to detect at least one of an environment temperature and an environment humidity;

a primary transfer voltage source configured to apply a primary transfer voltage so as to flow a current of a first current value between the primary transfer member and the intermediary transfer member;

a secondary transfer voltage source configured to apply a secondary transfer voltage so as to flow a current of a second current value between the secondary transfer member and the intermediary transfer member; and a control portion configured to control the primary transfer voltage source and the secondary transfer voltage source, wherein, based on a detecting result of the environmental sensor, the control portion controls so as to change a current balance based on an integrated value of the first current value and an integrated value of the second current value, the first current value being the current flowing from inside of the intermediary transfer member to outside thereof and the second current value being the current flowing from outside of the intermediary transfer member to inside thereof, and wherein the control portion controls so as to increase an absolute value of the current balance in a case that at least one of the temperature and the humidity indicated by the detecting result of the environmental sensor is lower than that in a predetermined environment.

2. An image forming apparatus according to claim 1, wherein the control portion further controls so as to increase an absolute value of the current balance based on the current balance in a past predetermined period.

3. An image forming apparatus according to claim 2, wherein the control portion controls so as to increase the absolute value of the current balance in a case that at least one of the temperature and the humidity indicated by the detecting result of the environmental sensor is lower than that in the predetermined environment and the absolute value of the current balance in the past predetermined period is lower than a predetermined value.

4. An image forming apparatus according to claim 1, wherein the control portion further controls so as to increase the absolute value of the current balance based on a full color mode or a monochrome mode in the image forming apparatus.

5. An image forming apparatus according to claim 4, wherein the control portion controls so as to increase the absolute value of the current balance in a case that at least one of the temperature and the humidity indicated by the detecting result of the environmental sensor is lower than that in the predetermined environment and the image forming apparatus is in the monochrome mode.

6. An image forming apparatus according to claim 1, wherein the control portion controls the secondary transfer voltage source so as to change the current balance during a period when the toner image is not transferred from the intermediary transfer member to the recording material at the secondary transfer portion.

7. An image forming apparatus according to claim 1, wherein the control portion controls the primary transfer voltage source so as to change the current balance during a period when the toner image is not transferred from the image bearing member to the intermediary transfer member at the primary transfer portion.

8. An image forming apparatus according to claim 1, wherein the intermediary transfer member contains an alkali metal salt as an ion conductive material exhibiting the ion conductivity.

9. An image forming apparatus comprising:

an image bearing member configured to bear a toner image;

an intermediary transfer member having ion conductivity and a rotatable endless belt shape;

a primary transfer member configured to primary-transfer the toner image from the image bearing member to the intermediary transfer member at a primary transfer portion;

a secondary transfer member configured to secondary-transfer the toner image from the intermediary transfer member to a recording material at a secondary transfer portion;

a cleaning member configured to remove deposited matter from an outer surface of the intermediary transfer member by contacting the outer surface of the intermediary transfer member, the cleaning member including a cleaning blade contacting the outer surface of the intermediary transfer member in a counter direction with respect to a rotational direction of the intermediary transfer member;

an environmental sensor configured to detect at least one of an environment temperature and an environment humidity;

a primary transfer voltage source configured to apply a primary transfer voltage so as to flow a current of a first current value between the primary transfer member and the intermediary transfer member;

a secondary transfer voltage source configured to apply a secondary transfer voltage so as to flow a current of a second current value between the secondary transfer member and the intermediary transfer member; and a control portion configured to control the primary transfer voltage source and the secondary transfer voltage source, wherein, based on a detecting result of the environmental sensor, the control portion controls so as to change a current balance based on an integrated value of the first current value and an integrated value of the second current value, the first current value being the current flowing from inside of the intermediary transfer member to outside thereof and the second current value being the current flowing from outside of the intermediary transfer member to inside thereof, and wherein the control portion controls so as to decrease an absolute value of the current balance in a case that at least one of the temperature and the humidity indicated by the detecting result of the environmental sensor is higher than that in a predetermined environment.

10. An image forming apparatus according to claim 9, wherein the control portion further controls so as to decrease the absolute value of the current balance based on the current balance in a past predetermined period.

11. An image forming apparatus according to claim 10, wherein the control portion controls so as to decrease the absolute value of the current balance in a case that at least one of the temperature and the humidity indicated by the detecting result of the environmental sensor is higher than that in the predetermined environment and the absolute value of the current balance in the past predetermined period is higher than a predetermined value.

12. An image forming apparatus according to claim 9, wherein the control portion further controls so as to decrease the absolute value of the current balance based on a full color mode or a monochrome mode in the image forming apparatus.

13. An image forming apparatus according to claim 12, wherein the control portion controls so as to decrease the absolute value of the current balance in a case that at least one of the temperature and the humidity indicated by the detecting result of the environmental sensor is higher than that in the predetermined environment and the image forming apparatus is in the full color mode.

14. An image forming apparatus according to claim 9, wherein the control portion further controls so as to increase an absolute value of the current balance based on the current balance in a past predetermined period.

15. An image forming apparatus according to claim 14, wherein the control portion controls so as to increase the absolute value of the current balance in a case that at least one of the temperature and the humidity indicated by the detecting result of the environmental sensor is lower than that in the predetermined environment and the absolute value of the current balance in the past predetermined period is lower than a predetermined value.

16. An image forming apparatus comprising:

an image bearing member configured to bear a toner image;

an intermediary transfer member having ion conductivity and a rotatable endless belt shape;

a primary transfer member configured to primary-transfer the toner image from the image bearing member to the intermediary transfer member at a primary transfer portion;

a secondary transfer member configured to secondary-transfer the toner image from the intermediary transfer member to a recording material at a secondary transfer portion;

a cleaning member configured to remove deposited matter from an outer surface of the intermediary transfer member by contacting the outer surface of the intermediary transfer member;

a torque detecting circuit configured to detect a rotational torque of a motor for driving the intermediary transfer member;

a primary transfer voltage source configured to apply a primary transfer voltage so as to flow a current of a first current value between the primary transfer member and the intermediary transfer member;

a secondary transfer voltage source configured to apply a secondary transfer voltage so as to flow a current of a second current value between the secondary transfer member and the intermediary transfer member; and a control portion configured to control the primary transfer voltage source and the secondary transfer voltage source, wherein, based on a detecting result of the torque detecting circuit, the control portion controls so as to change a current balance based on an integrated value of the first current value and an integrated value of the second current value, the first current value being the current flowing from inside of the intermediary transfer member to outside thereof and the second current value being the current flowing from outside of the intermediary transfer member to inside thereof.

17. An image forming apparatus according to claim 16, wherein the control portion controls so as to increase an absolute value of the current balance in a case that the rotational torque indicated by the detecting result of the torque detecting circuit is lower than a predetermined value.

18. An image forming apparatus according to claim 16, wherein the control portion controls so as to decrease an absolute value of the current balance in a case that the rotational torque indicated by the detecting result of the torque detecting circuit is higher than a predetermined value.

19. An image forming apparatus according to claim 16, wherein the control portion controls the secondary transfer voltage source so as to change the current balance during a period when the toner image is not transferred from the intermediary transfer member to the recording material at the secondary transfer portion.

20. An image forming apparatus according to claim 16, wherein the control portion controls the primary transfer voltage source so as to change the current balance during a period when the toner image is not transferred from the image bearing member to the intermediary transfer member at the primary transfer portion.

* * * * *